United States Patent
Lee et al.

(10) Patent No.: US 10,043,321 B2
(45) Date of Patent: Aug. 7, 2018

(54) APPARATUS AND METHOD FOR EDITING THREE-DIMENSIONAL BUILDING DATA

(71) Applicant: ELECTRONICS AND TELECOMMUNICATIONS RESEARCH INSTITUTE, Daejeon (KR)

(72) Inventors: Ji Hyung Lee, Daejeon-si (KR); Jae Woo Kim, Daejeon-si (KR); Man Hee Lee, Daejeon-si (KR); Kyung Kyu Kang, Seoul (KR); Chang Joon Park, Daejeon-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 106 days.

(21) Appl. No.: 15/236,697

(22) Filed: Aug. 15, 2016

(65) Prior Publication Data
US 2017/0256100 A1    Sep. 7, 2017

(30) Foreign Application Priority Data
Mar. 2, 2016    (KR) .................. 10-2016-0025282

(51) Int. Cl.
*G06T 19/20* (2011.01)
*G06F 17/50* (2006.01)
*G06T 17/10* (2006.01)

(52) U.S. Cl.
CPC .......... *G06T 19/20* (2013.01); *G06F 17/5004* (2013.01); *G06T 17/10* (2013.01);
(Continued)

(58) Field of Classification Search
CPC ................ G06T 17/00; G06T 2200/04; G06T 2207/10028; G06T 2207/20021;
(Continued)

(56) References Cited

U.S. PATENT DOCUMENTS

2005/0099637 A1*  5/2005  Kacyra ............... G01B 11/002
                                                   356/601
2005/0131658 A1*  6/2005  Mei ....................... G06T 19/00
                                                     703/1

(Continued)

FOREIGN PATENT DOCUMENTS

KR    10-0842666 B1    6/2008
KR    10-0898557 B1    5/2009
(Continued)

OTHER PUBLICATIONS

Dore, Conor, and Maurice Murphy. "Semi-automatic generation of as-built BIM façade geometry from laser and image data." Journal of Information Technology in Construction (ITcon) 19.2 (2014): 20-46.*

*Primary Examiner* — Sultana Marcia Zalalee
(74) *Attorney, Agent, or Firm* — LRK Patent Law Firm

(57) ABSTRACT

An apparatus and method for editing three-dimensional (3D) building data. The apparatus for editing the 3D building data includes an input unit configured to obtain 3D scan data of a building, and a processor configured to divide the obtained 3D scan data of the building in units of construction components.

16 Claims, 4 Drawing Sheets

(52) U.S. Cl.
CPC ...... *G06F 2217/02* (2013.01); *G06T 2210/04* (2013.01); *G06T 2219/2004* (2013.01)

(58) Field of Classification Search
CPC ..... G06T 2210/56; G06T 7/0081; G06T 7/11; G06T 7/136; G06T 7/194; G06T 17/10; G06T 19/20; G06T 2210/04; G06T 2219/2004; G06F 17/5004; G06F 2217/02
See application file for complete search history.

(56) References Cited

U.S. PATENT DOCUMENTS

| | | | |
|---|---|---|---|
| 2008/0040080 A1 | 2/2008 | Bae et al. | |
| 2008/0117205 A1* | 5/2008 | Storti | G06T 17/00 345/420 |
| 2008/0249756 A1* | 10/2008 | Chaisuparasmikul | G06F 17/5004 703/13 |
| 2009/0027412 A1* | 1/2009 | Burley | G06T 15/04 345/582 |
| 2013/0002649 A1* | 1/2013 | Wu | G06T 19/006 345/419 |
| 2013/0187919 A1* | 7/2013 | Medioni | G06T 17/00 345/420 |
| 2013/0207966 A1* | 8/2013 | Chu | G06T 17/00 345/419 |
| 2014/0125671 A1* | 5/2014 | Vorobyov | G01C 11/00 345/427 |
| 2015/0009214 A1* | 1/2015 | Lee | G06T 17/10 345/420 |
| 2015/0063683 A1* | 3/2015 | Fu | G06K 9/00201 382/154 |
| 2015/0138310 A1* | 5/2015 | Fan | G06K 9/00201 348/36 |
| 2015/0206023 A1* | 7/2015 | Kochi | G01L 311/00 382/199 |
| 2016/0299997 A1* | 10/2016 | Mitchell | G06F 17/5004 |

FOREIGN PATENT DOCUMENTS

| | | |
|---|---|---|
| KR | 10-1237434 B1 | 2/2013 |
| KR | 10-1410566 B1 | 6/2014 |

* cited by examiner

APPARATUS AND METHOD FOR EDITING THREE-DIMENSIONAL BUILDING DATA

CROSS-REFERENCE TO RELATED APPLICATION(S)

This application claims priority to Korean Patent Application No. 10-2016-0025282, filed Mar. 2, 2016, in the Korean Intellectual Property Office, the disclosure of which is incorporated herein by reference in its entirety.

BACKGROUND

1. Field

The following description relates to digital content technology, and more particularly, to technology creating graphics.

2. Description of Related Art

Building information modeling (hereinafter, it is referred to as BIM) technology can manage both digital drawings and additional information related to a building unlike a computer aided design (CAD), and the additional information includes three-dimensional (3D) data. Further, when considering the purpose of the BIM, construction components used when actually constructing the building are emerged as an important management object, and when the 3D data is used as construction component data, various attempts are available.

The 3D building data is generated through a graphic modeling, or generated using 3D scan technology. Recently, a high definition scanning is available due to developments of global 3D scan technology, and 3D scanning data of the building is largely being used.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to an apparatus and method for editing three-dimensional (3D) building data capable of dividing 3D scan data of a building into 3D scan data which is in units of building components.

In one general aspect, an apparatus for editing three-dimensional (3D) building data, includes: an input unit configured to obtain 3D scan data of a building; and a processor configured to divide the obtained 3D scan data of the building in units of construction components.

The 3D scan data of the building may be point cloud data in which noise is removed from original data obtained through a 3D scanner. The processor may divide the 3D scan data in units of components using 3D component model data generated for each component based on a drawing of the building. The 3D component model data may be solid model data in which the outside and the inside of a model are differentiated.

The processor may include: a position adjustment unit configured to adjust each of the positions of the 3D scan data and the 3D component model data based on the drawing; a position optimization unit configured to adjust the position of the 3D component model data based on point cloud data of which the position is adjusted; and a division unit configured to divide the 3D scan data in units of components based on the 3D component model data according to the position adjustment through the position adjustment unit and the position optimization unit.

The position optimization unit may receive n pieces of the 3D scan data selected by a user based on each face of the 3D component model data for each component, calculate a distance Pd(x) between the centers of gravity of the n pieces of the 3D scan data and a face x of the 3D component model data y, and calculate an optimized movement value f(x) of a face in which a value of Pd(x) is minimized on a space. When the optimized movement value f(x) on each face of the 3D component model data y is calculated, the position optimization unit may calculate a point 0(y) at which the optimized movement value f(x) of each face is minimized while maintaining an original shape of the component.

When there is the 3D scan data in the face of the 3D component model data, the position division unit may sample the 3D scan data corresponding to the face of the 3D component model data, and divide the sampled 3D scan data in units of components. When there is not the 3D scan data in the face of the 3D component model data, the position division unit may sample the 3D component model data, and divide the 3D scan data in units of components based on the sampled 3D component model data.

In another general aspect, a method for editing three-dimensional (3D) building data, includes: obtaining 3D scan data of a building; and dividing the obtained 3D scan data of the building in units of construction components. The 3D scan data of the building may be point cloud data in which noise is removed from original data obtained through a 3D scanner.

The dividing of the obtained 3D scan data of the building may divide the 3D scan data in units of components using 3D component model data generated for each component based on a drawing of the building. The 3D component model data may be solid model data in which the outside and the inside of a model are differentiated.

The dividing of the obtained 3D scan data of the building may include: adjusting each of the positions of the 3D scan data and the 3D component model data based on the drawing; adjusting the position of the 3D component model data based on point cloud data of which the position is adjusted; and dividing the 3D scan data in units of components based on the 3D component model data according to the position adjustment.

The adjusting of the position of the 3D component model data may include: receiving n pieces of the 3D scan data selected by a user based on each face of the 3D component model data for each component; calculating a distance Pd(x) between the centers of gravity of the selected n pieces of the 3D scan data and a face x of the 3D component model data y; and calculating an optimized movement value f(x) of a face in which a value of Pd(x) is minimized on a space. When the optimized movement value f(x) of each face of the 3D component model data y is calculated, the adjusting of the position of the 3D component model data may further include: calculating a point 0(y) at which the optimized movement value f(x) of each face is minimized while maintaining an original shape of the component.

When there is the 3D scan data in the face of the 3D component model data, the dividing of the obtained 3D scan data of the building may sample the 3D scan data corresponding to the face of the 3D component model data, and divide the sampled 3D scan data in units of components. When there is not the 3D scan data in the face of the 3D component model data, the dividing of the obtained 3D scan data of the building may sample the 3D component model data, and divide the 3D scan data in units of components based on the sampled 3D component model data.

Other features and aspects will be apparent from the following detailed description, the drawings, and the claims.

Figure 1:
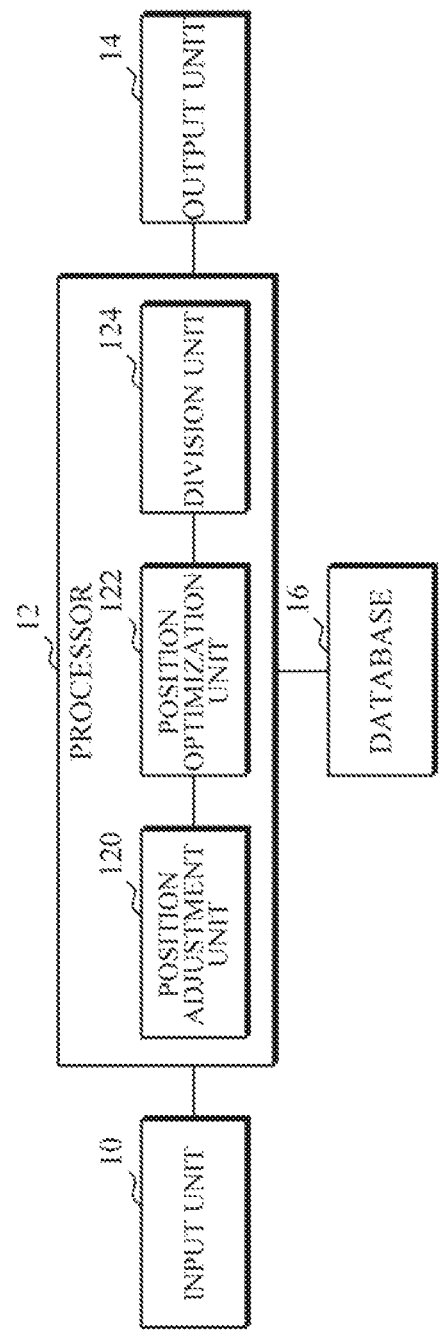
FIG. 1 is a block diagram illustrating an apparatus for editing three-dimensional (3D) building data according to an embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Hereinafter, embodiments of the present invention will be described in detail with reference to the accompanying drawings. In describing the present invention, when it is determined that detailed descriptions of well-known functions and constructions are unnecessarily obscure a subject matter of the present invention, a detailed description thereof will be omitted. Further, the terms which will be described hereinafter are terms defined by considering functions used for the present invention, and may differ according to intensions of a user and an operator or custom. Therefore, the definition should be determined based on the contents described in the specification.

FIG. 1 is a block diagram illustrating an apparatus for editing three-dimensional (3D) building data according to an embodiment of the present invention.

Referring to FIG. 1, an apparatus for editing 3D building data 1 (hereinafter, it may be referred to as an "editing apparatus") may include an input unit 10, a processor 12, and an output unit 14, and may further include a database 16.

The editing apparatus 1 may divide 3D scan data of a building in units of components. In this case, the editing apparatus 1 may divide the 3D scan data of the building in units of components using 3D component model data generated for each component manufactured based on a drawing of a corresponding building. Through this operation, the editing apparatus 1 may generate data having high reliability satisfying a characteristic of each component inside the building while maintaining appearance of an actual building.

The 3D scan data may precisely represent an actual object, but may not be seen by being veiled at a measurement point when obtaining the 3D scan data due to a straightness of the 3D data, or a portion located inside may not be scanned. Generally, the 3D scan data related to the building may be data obtained by scanning an entire building three-dimensionally outside the building, and be data which does not have inner structure data and is not divided in units of components. Accordingly, in order to create the 3D construction component used for a building information modeling (BIM) using a 3D scanner, the 3D data should be generated by performing a 3D scanning in units of components before constructing the building, or be generated by deconstructing the building and scanning in units of components when the building is already constructed. In particular, since the component of the building such as a cultural heritage building has a difference between components of the same kind and is not formalized, a size and a shape of the component may be different from each other little by little even in the same component. In order to solve the problem, the editing apparatus 1 for dividing the 3D scan data of the building in units of components using the 3D component model data generated based on the drawing of the corresponding building may be provided.

The input unit 10 of the editing apparatus 1 may obtain the 3D scan data of the building, the drawing illustrating the construction component configuring the building, and the 3D component model data generated in units of components based on the drawing. The data may have the following characteristics.

The 3D scan data of the building may be data obtained by three-dimensionally scanning the entire building or some areas of the building, and be point cloud data in which noise is removed from original data obtained through a 3D scanner. The point cloud data may be generated with respect to only the exterior of an object, and this is a disadvantage of the 3D scanner. That is, the point cloud data corresponding to an outer part of the object seen by the 3D scanner may be generated when performing a 3D scanning, and the point cloud data corresponding to a covered or unexposed part may not be generated. Hereinafter, for convenience of explanation, the 3D scan data is limited to the point cloud data.

The 3D component model data generated based on the drawing may be not a simple polygon model but solid model data in which the inside and the outside of a model are differentiated, and a virtual building may be digitally constructed by collecting the 3D component model data for each component.

The processor 12 may divide the 3D scan data of the building received through the input unit 10 in units of components using the 3D component model data in which the component is constructed based on the drawing of the corresponding building. The processor 12 according to an embodiment of the present invention may include a position adjustment unit 120, a position optimization unit 122, and a division unit 124.

The position adjustment unit 120 may adjust a position in order to compare the point cloud data and the 3D component model data by positioning them in the same position on a 3D space based on the drawing. In this case, since the point cloud data is a large amount of data and is not divided in units of components, the position may be adjusted in a method of adjusting an entire appearance in the drawing.

Since the 3D component model data is constructed by a plurality of pieces of data, the position may be adjusted by finding a corresponding position in the drawing on each piece of data. The position adjustment may be performed by moving the 3D component model data based on the drawing by a user. Through this operation, the point cloud data and the 3D component model data may be approximately arranged in the same position on the 3D space based on the drawing.

The position optimization unit 122 may finely adjust the position by arranging a position of the 3D component model data y based on the point cloud data. For this, n pieces of the point cloud data may be selected by the user based on each face constructing the 3D component model data. Further, an optimized movement value f(x) in which a value Pd(x) is minimized on the space may be obtained by calculating a distance Pd(x) between the centers of gravity of the selected n pieces of point cloud data and the 3D component model data y using the following Equation 1.

$$f(x) = \min(Pd(x)) < \delta \qquad \text{[Equation 1]}$$
$$Pd(x) = \sum_{n=1}^{n} (p_n - c)$$

In Equation 1, the centers of gravity of the face may be set using a conventional well-known method, and the optimized movement value f(x) of the face may should be within an erroneous range δ set by the user. The optimized movement value f(x) for each face may be calculated by repeatedly performing the operation described above on other faces of the 3D component model data.

When the optimized movement value f(x) is calculated on every face (m faces) of the 3D component model data y, an optimization point O(y) at which the movement value of each face is minimized while maintaining an original shape of the component may be calculated by the following Equation 2 (S330).

$$O(y) = \min\left(\sum_{x=1}^{m} f(x)\right) \qquad \text{[Equation 2]}$$

Through the operation described above, the position adjustment between one piece of the 3D component model data and the point cloud data may be performed. Accordingly, the position adjustment which is approximately set by the user may be finely corrected. The operation described above may be repeated until the position adjustment on the 3D component model data of every component is completed.

The division unit 124 may divide the cloud point data using the 3D component model data of which the position is adjusted based on the point cloud data. When there is the point cloud data which is approximately selected by the user in the face of each piece of the 3D component model data, the division unit 124 may divide sampled point cloud data obtained by sampling the point cloud data corresponding to the face of the 3D component model data based on the 3D component model data. It may be possible since the 3D component model data is the solid model data, the solid model data of any object may have an attribute capable of differentiating the outside and the inside of the object on the 3D space.

However, since the point cloud data is incomplete data in which there is no data of an invisible part when performing the 3D scanning, there may not be the point cloud data corresponding to any face of the 3D component model data. Accordingly, in this case, a part in which there is not the point cloud data may be filled using a value obtained by sampling the 3D component model data as division data. After processing every face on one component as described above, the division of the point cloud data on one piece of the 3D component model data may be completed. When this operation is repeatedly performed on every piece of the 3D component model data, the division on every piece of the point cloud data may be completed.

The output unit 14 may display information generated while the processor 12 is operated on a screen. The output unit 14 may display two-dimensional scan data divided in units of components through the processor 12 on the screen. Information needed for the operation of the processor 12 or information generated during the operation may be stored in the database 16. The 3D scan data, the drawing, and the 3D component model data may be stored in the database 16.

Figure 2:
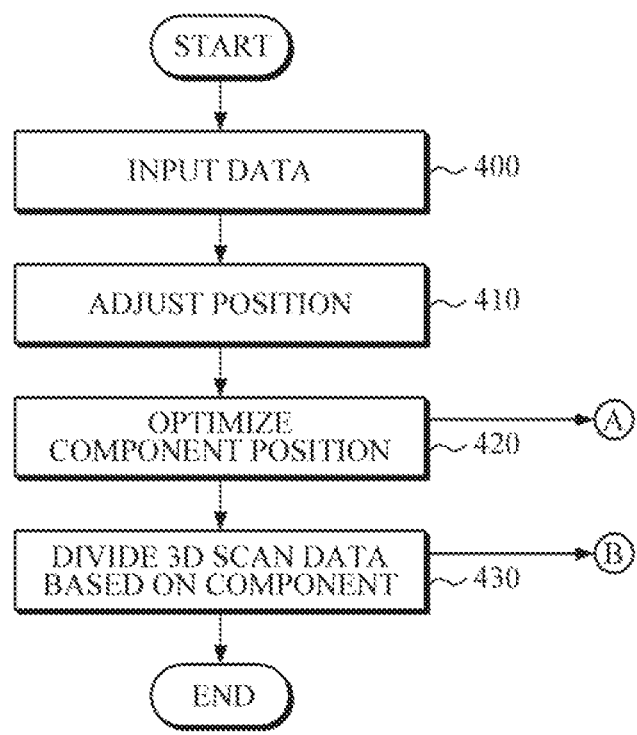
FIG. 2 is a flowchart illustrating a method for editing 3D building data according to an embodiment of the present invention.

FIG. 2 is a flowchart illustrating a method of editing 3D building data according to an embodiment of the present invention.

Referring to FIG. 2, the editing apparatus may receive the 3D scan data of the building, the drawing illustrating the construction component constructing the building, and the 3D component model data generated in units of components based on the drawing (S400).

Next, the editing apparatus may adjust each of the positions of the 3D scan data and the 3D component model data based on the drawing (S410), and optimize the position of the 3D component model data by adjusting the position of the 3D component model data based on the point cloud data of which the position is adjusted (S420). The optimization operation of the 3D component model data will be described later with reference to FIG. 3. Next, the editing apparatus may divide the 3D scan data in units of components based on the 3D component model data according to the position adjustment (S430). The division operation of the 3D scan data will be described later with reference to FIG. 4.

Figure 3:
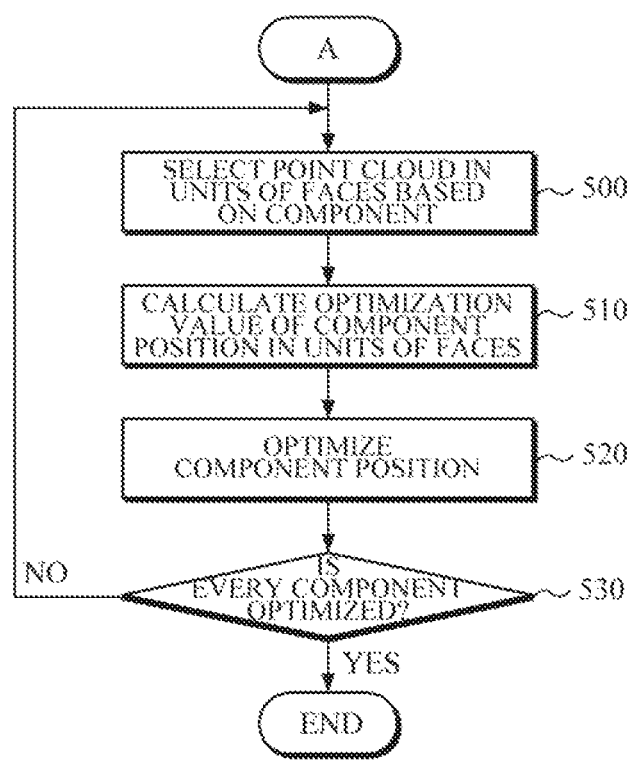
FIG. 3 is a flowchart illustrating an operation of optimizing 3D component model data according to an embodiment of the present invention.

FIG. 3 is a flowchart illustrating an operation of optimizing 3D component model data according to an embodiment of the present invention.

Referring to FIG. 3, the editing apparatus may receive n pieces of the point cloud data in units of faces selected by the user based on each face of the 3D component model data of each component (S500). Further, the editing apparatus may calculate the position optimization value of the component model data in units of faces (S510), and optimize the position of the component model data (S520). For example, the editing apparatus may calculate a distance Pd(x) between the centers of gravity of the selected n pieces of point cloud data and the face x of the 3D component model data y, and optimize one piece of the 3D component model data by calculating the optimized movement value f(x) of the face in which a value of Pd(x) is minimized on the space. When the optimized movement value f(x) on each face of the 3D component model data y is calculated, the editing apparatus may optimize one piece of the 3D component model data by calculating a point O(y) at which the optimized movement value f(x) of each face is minimized while maintaining the original shape of the component. The position of every piece of the component model data may be optimized by repeatedly performing the operation described above on every component (S530).

Figure 4:
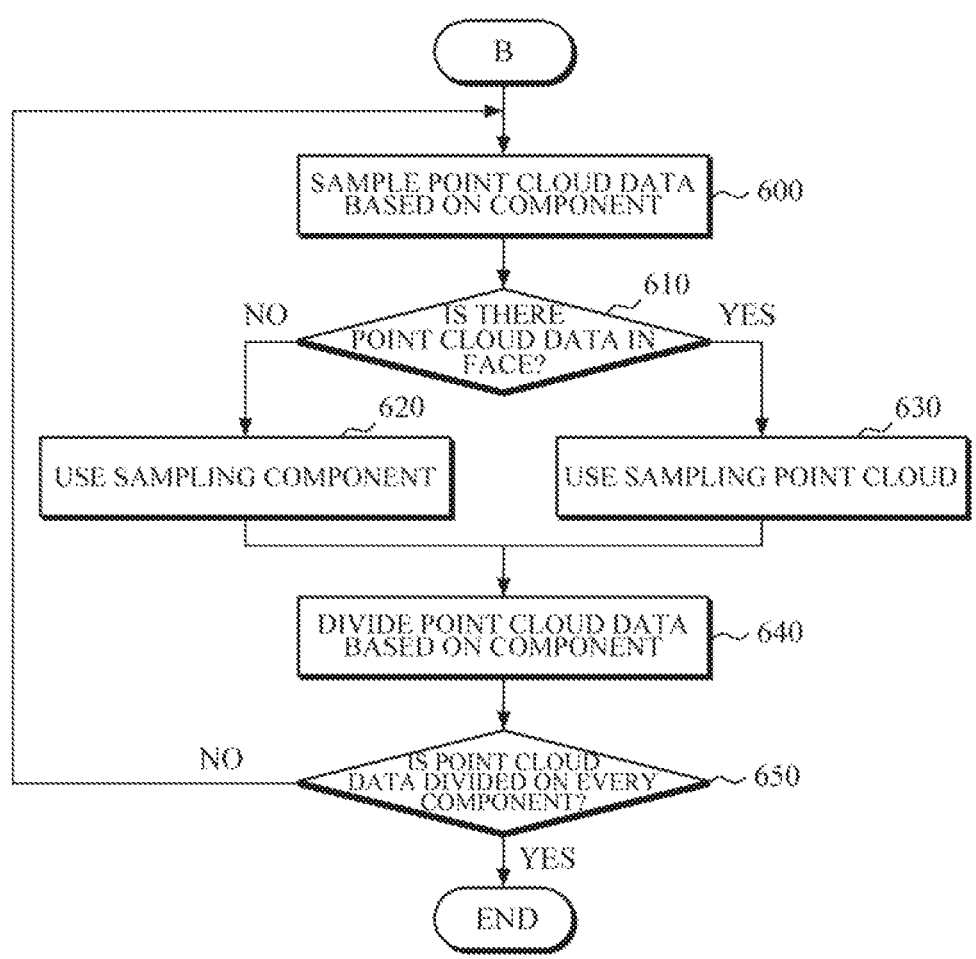
FIG. 4 is a flowchart illustrating an operation of dividing 3D scan data according to an embodiment of the present invention.

FIG. 4 is a flowchart illustrating an operation of dividing 3D scan data according to an embodiment of the present invention.

Referring to FIG. 4, the editing apparatus may sample the point cloud data corresponding to the face of the 3D component model data (S600). In this case, the editing apparatus may confirm whether there is the point cloud data corresponding to the face of the 3D component model data (S610), use a previously sampled point cloud data corresponding to the face of the 3D component model data when there is the point cloud data corresponding to the face of the 3D component model data (S630), and divide the point cloud data based on the 3D component model data (S640). Every division on the point cloud data may be completed by repeatedly performing the division operation described above on every piece of the 3D component model data (S650).

On the contrary, when the editing apparatus confirms whether there is the point cloud data corresponding to the face of the 3D component model data (S610), the editing apparatus may sample the 3D component model data when there is not the point cloud data corresponding to the face of the 3D component model data (S620), and divide the point cloud data in units of components based on the 3D component model data (S640). Every division on the point cloud data may be completed by repeatedly performing the division operation described above on every piece of the 3D component model data (S650).

According to an embodiment of the present invention, a disadvantage of the 3D scan method may be solved since a complex model having data for each component based on appearance of realistic high definition data which is an advantage of the 3D scan method and data based on the drawing is created. Further, the present invention may be used for dividing the 3D scan data of the building in units of components and processing the 3D scan data, may be used for processing the 3D scan data, and may be generally applied to similar examples of using the 3D model data.

While the present invention has been described with reference to the above-described embodiments, it should be apparent to those skilled in the art that various modifications can be made to the above-described embodiments of the present invention without departing from the spirit or scope of the invention. Accordingly, the scope of the present invention is not limited to the above-described embodiments, and includes various embodiments included in the scope of the appended claims and their equivalents.

What is claimed is:

1. An apparatus for editing three-dimensional (3D) building data, comprising:
   an input unit configured to obtain 3D scan data of a building; and
   a processor configured to divide the 3D scan data of the building in units of construction components,
   wherein the processor comprises:
   a position adjustment unit configured to adjust each of positions of the 3D scan data and 3D component model data based on a drawing of the building;
   a position optimization unit configured to adjust the position of the 3D component model data based on point cloud data of which the position is adjusted; and
   a division unit configured to divide the 3D scan data in units of components based on the 3D component model data according to the position adjustment through the position adjustment unit and the position optimization unit.

2. The apparatus for editing the 3D building data of claim 1, wherein the 3D scan data of the building is point cloud data in which noise is removed from original data obtained through a 3D scanner.

3. The apparatus for editing the 3D building data of claim 1, wherein the processor divides the 3D scan data in units of components using the 3D component model data generated for each component based on the drawing of the building.

4. The apparatus for editing the 3D building data of claim 3, wherein the 3D component model data is solid model data in which the outside and the inside of a model are differentiated.

5. The apparatus for editing the 3D building data of claim 1, wherein the position optimization unit receives n pieces of the 3D scan data selected by a user based on each face of the 3D component model data for each component, calculates a distance Pd(x) between the centers of gravity of the n pieces of the 3D scan data and a face x of the 3D component model data y, and calculates an optimized movement value f(x) of a face in which a value of Pd(x) is minimized on a space.

6. The apparatus for editing the 3D building data of claim 5, wherein, when the optimized movement value f(x) on each face of the 3D component model data y is calculated, the position optimization unit calculates a point 0(y) at which the optimized movement value f(x) of each face is minimized while maintaining an original shape of the component.

7. The apparatus for editing the 3D building data of claim 1, wherein, when there is the 3D scan data in a face of the 3D component model data, the position division unit samples the 3D scan data corresponding to the face of the 3D component model data, and divides the sampled 3D scan data in units of components.

8. The apparatus for editing the 3D building data of claim 1, wherein, when there is not the 3D scan data in a face of the 3D component model data, the position division unit samples the 3D component model data, and divides the 3D scan data in units of components based on the sampled 3D component model data.

9. A method for editing three-dimensional (3D) building data, comprising:
   obtaining 3D scan data of a building; and
   dividing the 3D scan data of the building in units of construction components,
   wherein the dividing of the obtained 3D scan data of the building comprises:
   adjusting each of positions of the 3D scan data and 3D component model data based on a drawing of the building;
   adjusting the position of the 3D component model data based on point cloud data of which the position is adjusted; and
   dividing the 3D scan data in units of components based on the 3D component model data according to the position adjustment.

10. The method for editing the 3D building data of claim 9, wherein the 3D scan data of the building is point cloud data in which noise is removed from original data obtained through a 3D scanner.

11. The method for editing the 3D building data of claim 9, wherein the dividing of the obtained 3D scan data of the building divides the 3D scan data in units of components using the 3D component model data generated for each component based on the drawing of the building.

12. The method for editing the 3D building data of claim 11, wherein the 3D component model data is solid model data in which the outside and the inside of a model are differentiated.

13. The method for editing, the 3D building data of claim 9, wherein the adjusting of the position of the 3D component model data comprises:
   receiving n pieces of the 3D scan data selected by a user based on each face of the 3D component model data for each component;
   calculating a distance Pd(x) between the centers of gravity of the selected n pieces of the 3D scan data and a face x of the 3D component model data y; and
   calculating an optimized movement value f(x) of a face in which a value of Pd(x) is minimized on a space.

14. The method for editing the 3D building data of claim 13, wherein, when the optimized movement value f(x) of each face of the 3D component model data y is calculated, the adjusting of the position of the 3D component model data further comprises calculating a point 0(y) at which the optimized movement value f(x) of each face is minimized while maintaining an original shape of the component.

15. The method for editing the 3D building data of claim 9, wherein, when there is the 3D scan data in a face of the 3D component model data, the dividing of the obtained 3D scan data of the building samples the 3D scan data corresponding to the face of the 3D component model data, and divides the sampled 3D scan data in units of components.

16. The method for editing the 3D building data of claim 9, wherein, when there is not the 3D scan data in a face of the 3D component model data, the dividing of the obtained 3D scan data of the building samples the 3D component model data, and divides the 3D scan data in units of components based on the sampled 3D component model data.

* * * * *